United States Patent [19]

Kurata et al.

[11] Patent Number: 5,369,396
[45] Date of Patent: Nov. 29, 1994

[54] APPARATUS FOR DETECTING A LEVEL OF LIQUID

[75] Inventors: Nobuo Kurata, Hekinan; Hiroshi Tooyama, Nishikamo, both of Japan

[73] Assignee: Toyota Jidosha Kabushiki Kaisha, Aichi, Japan

[21] Appl. No.: 58,590

[22] Filed: May 7, 1993

[30] Foreign Application Priority Data

May 14, 1992 [JP] Japan .................. 4-122222

[51] Int. Cl.$^5$ ............................. G08B 21/00
[52] U.S. Cl. ............................. 340/623; 340/618; 340/450.3; 73/308
[58] Field of Search ........... 340/618, 622, 623, 624, 340/450.3; 73/304 R, 305, 307, 308, 295

[56] References Cited

U.S. PATENT DOCUMENTS 5,196,824  3/1993  Helm .................. 340/624 X

FOREIGN PATENT DOCUMENTS 62-120  6/1985  Japan .

OTHER PUBLICATIONS

Toyota Crown Majesta New Car Manual, published Oct., 1991, pp. 2-14, 2-15, 2-16, and 2-17.

Primary Examiner—Jeffery A. Hofsass
Attorney, Agent, or Firm—Kenyon & Kenyon

[57] ABSTRACT

An apparatus for detecting a liquid level includes a warning device for warning a low liquid level, and a regulator for controlling power supply to the warning device from a power source. The regulator comprises a switch for switching its condition in accordance with the liquid level. The ON condition of the switch indicates that the present liquid level is lower than a predetermined liquid level. The regulator further comprises a thermistor connected to the switch in series. The thermistor has a characteristic of decreasing the resistance value thereof, when a predetermined delay period of time as a function of atmospheric temperature has elapsed since the start of applying the voltage on the thermistor, synchronizing with turning the switch on. The low resistance value of the thermistor allows the power for activating the warning device to be supplied to its device, while the switch is turned on.

8 Claims, 4 Drawing Sheets

APPARATUS FOR DETECTING A LEVEL OF LIQUID

BACKGROUND OF THE INVENTION

1. Field of the Invention

The present invention generally relates to an apparatus for detecting a level of liquid which is stored in a reservoir. More particularly, the present invention pertains to an apparatus used in an engine, for detecting the level of engine oil, and for warning the driver when there is a shortage of the engine oil.

2. Description of the Related Art

In general, a level warning system for engine oil is known, which includes a level sensor for detecting the level of the engine oil. For example, a "TOYOTA CROWN MAJESTA NEW CAR MANUAL" (published on October, 1991) discloses a conventional and typical oil level warning system.

According to this publication, an oil level sensor is attached to an oil pan which is secured to the bottom portion of an engine. The oil level sensor includes a reed switch and a thermal switch. A float, which is floatable on the oil, is provided around the reed switch to be vertically movable. The reed switch changes its condition between the "ON" and "OFF" conditions, in accordance with the position of the float (or float height). The thermal switch changes its condition between the "ON" and "OFF" conditions, in accordance with the engine oil temperature.

The warning system includes an electronic control unit circuit (ECU circuit) which is exclusively used for warning, and a display unit mounted in an instrument panel at a driver's seat. When the ECU circuit receives a signal transmitted from the oil level sensor, which indicates that the oil level is below the requirement level, the ECU circuit transmits a signal to the display unit, so as to display a warning sentence to notify a driver that the engine oil is in the insufficient condition.

When the engine oil temperature is less than a certain temperature, the viscosity of oil is relatively high. In this case, the volume of oil supplied from the oil pan to every part of the engine by means of an oil pump exceeds the required volume. In other words, the volume of oil left in the oil pan is relatively small. This kind of condition or phenomenon is called "Oil Rise". The Oil Rise may cause the oil level to be judged as decreased, even when a sufficient volume of oil is originally supplied.

Considering this condition, according to the conventional warning system, when the oil temperature is low, the thermal switch is in the "ON" condition. When the thermal switch is in the "ON" condition, the ECU circuit never permits the display unit to show the warning sentence which indicates the engine oil shortage, regardless of the reed switch condition. On the other hand, when the oil temperature is above a predetermined temperature and the oil level is below a predetermined level, both the thermal switch and the reed switch are in the "OFF" condition. At this time, the ECU circuit permits the display unit to show the warning sentence that indicates the oil shortage.

For example, when a vehicle is cornering, the oil level sensor may fail to detect a precise oil level, because of the sway or surging of the oil surface. To avoid the mal-detection, the conventional warning system further includes a delay timing circuit which delays the operation for detecting the switching of the signal transmitted from the reed switch by a predetermined period of time (approximately 40 seconds). Even when the reed switch temporarily detects a low oil level within the predetermined delay period of time, the ECU circuit ignores this temporal detection, by the action of the delay timing circuit. Therefore, the display unit never shows the warning sentence which indicates the oil shortage, based on the temporal detection of the low oil level.

However, requiring the ECU circuit and installing the delay timing circuit thereinto causes the entire circuit configuration of the system to be complicated and enlarged. As a result, the manufacturing cost of the system is increased.

SUMMARY OF THE INVENTION

Accordingly, it is a primary objective of the present invention to provide an apparatus with simple structure, which can preciously detect the decrease of liquid level under any conditions.

To achieve the foregoing and other objects and in accordance with the purpose of the present invention, an improved apparatus is provided for detecting the level of the liquid stored in a reservoir.

The apparatus includes a power source, a warning device for warning of a low liquid level, and a regulator for controlling power supply to the warning device from the power source. The regulator comprises a switch for switching its condition between the ON and OFF conditions in accordance with the liquid level. The ON condition of the switch indicates that the present liquid level is lower than a predetermined liquid level.

The regulator further comprises a thermistor connected to the switch in series. The thermistor has a characteristic of decreasing the resistance value thereof, when a predetermined delay period of time as a function of atmospheric temperature has elapsed since the start of applying the voltage on the thermistor, synchronizing with turning the switch on. The low resistance value of the thermistor allows the power for activating the warning device to be supplied to its device, while the switch is turned on.

BRIEF DESCRIPTION OF THE DRAWINGS

The features of the present invention that are believed to be novel are set forth with particularity in the appended claims. The invention, together objects and advantages thereof, may best be understood by reference to the following description of the presently preferred embodiments together with the accompanying drawings, in which

FIG. 1 is an electric circuit diagram of an oil shortage warning apparatus;

FIG. 2 is a cross-sectional view showing an oil level sensor and an oil pan;

FIG. 3 is a graph showing the correlation between a current and a voltage between terminals of a thermistor used in this embodiment;

FIG. 4 is a graph showing the correlation between an atmospheric temperature and a resistance of the thermistor used in this embodiment;

FIG. 5 is a graph showing the correlation between an atmospheric temperature and a delay period of time for a switching operation of the thermistor used in this embodiment;

FIG. 6 is a graph showing the correlation between an atmospheric temperature, and each of a condition of a reed switch, a resistance value of the thermistor and a condition of a warning lamp, when the oil level is high; and FIG. 7 is a graph showing the correlation between an atmospheric temperature, and each of a condition of the reed switch, a resistance value of the thermistor and a condition of the warning lamp, when the oil level is low.

DETAILED DESCRIPTION OF THE PREFERRED EMBODIMENT

A preferred embodiment of the present invention will now be described, referring to accompanying drawings. This embodiment describes an oil shortage warning apparatus, which is preferably employed in a vehicular engine.

Figure 1:
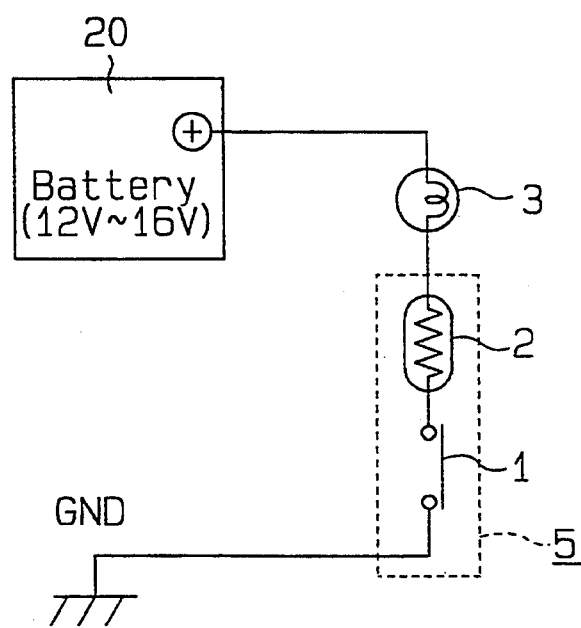
FIGS. 1 through 7 show a preferred embodiment according to the present invention.

FIG. 1 shows an electric circuit diagram of an oil shortage warning apparatus. This apparatus includes a reed switch 1, an NTC type thermistor 2 and a warning lamp 3, which are electrically connected to one another in series. A first end of this series circuit is connected to the positive terminal of a battery 20, and a second end thereof is grounded. A sensing circuit 5 is constructed by the reed switch 1 and the thermistor 2. The sensing circuit 5 is accommodated in an oil level sensor 4, as shown in FIG. 2.

Figure 2:
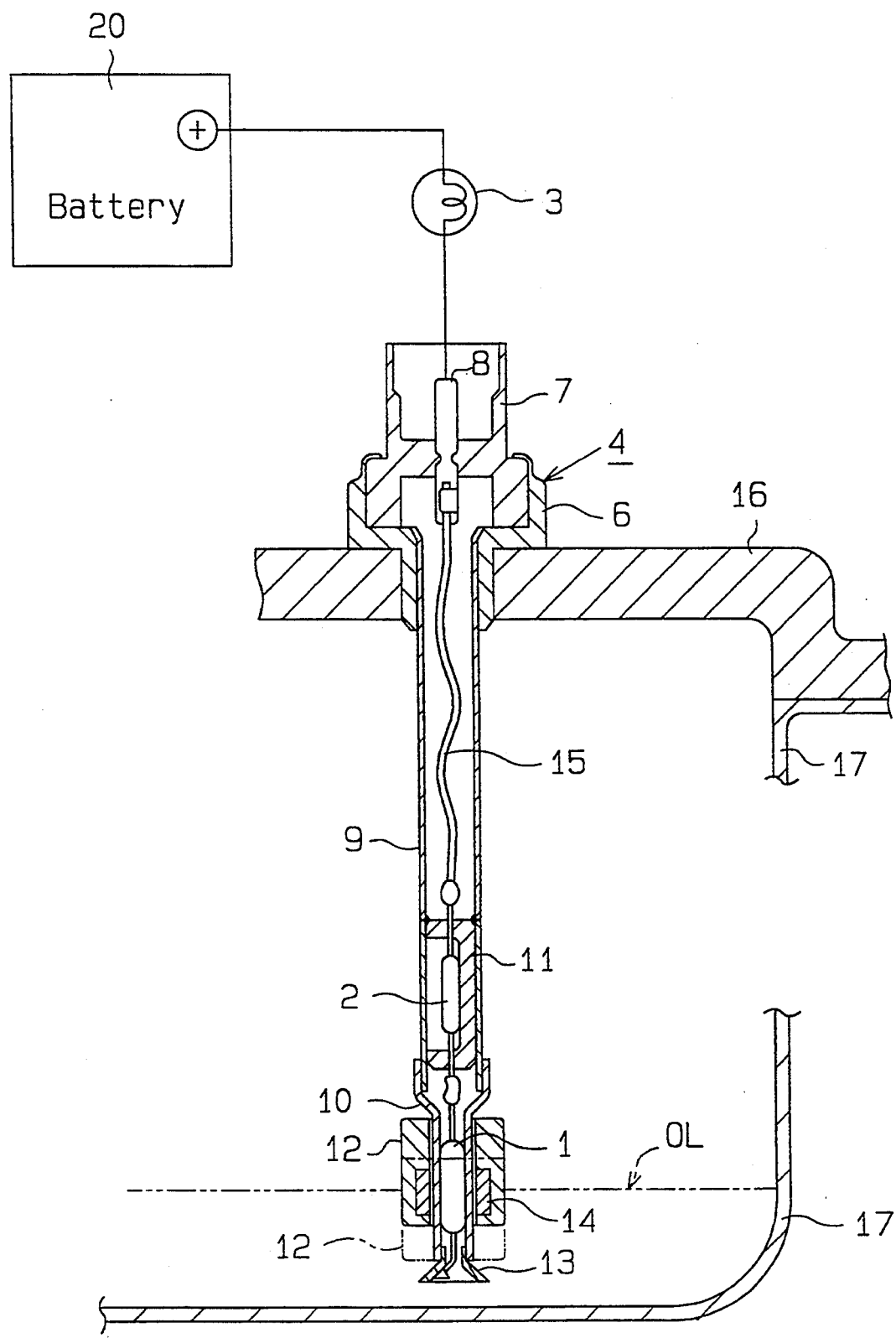

The reed switch 1 switches its condition in accordance with the motion of a float 12 of the oil level sensor 4 shown in FIG. 2. The "ON" condition of the reed switch 1 indicates that the switch 1 is conductive. The thermistor 2 performs a switching operation (i.e., turning ON) in accordance with an atmospheric temperature, after a predetermined period of time has elapsed since the start of the voltage application thereon. The characteristics of the thermistor 2 will be described hereinafter in detail.

Figure 3:
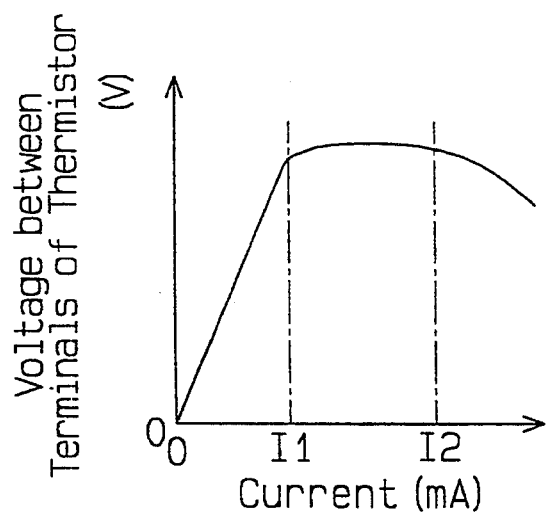

The graph shown in FIG. 3 shows the correlation between a current flowing in the thermistor 2, and a voltage between the terminals of the thermistor 2, on the basis of an experiment conducted at a certain atmospheric temperature. As the current value increases in the range between zero and I1, the voltage between the terminals increases. However, within the range of current values between I1 and I2, the voltage between the terminals hardly varies, regardless of the rise of the current. When the current value exceeds I2, the voltage between the terminals tends to decrease. This decrease of the resistance of the thermistor 2 is caused by self exothermic function when the current value exceeds I1.

Figure 4:
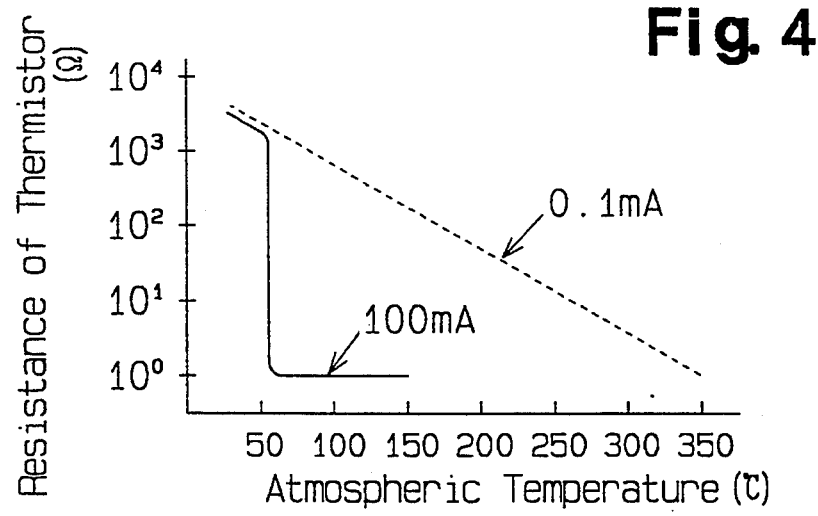

The graph shown in FIG. 4 shows the correlation between an atmospheric temperature and a resistance value of thermistor 2, on the basis of experiments conducted at the certain current values (i.e., 0.1 milliampere (mA), 100 milliampere (mA)). When the current value is at 0.1 mA, as an atmospheric temperature increases, the resistance value gradually decreases until the temperature reaches approximately 350° C. This characteristic is suitable for a thermistor, if it is used as a temperature measuring element. When the current value is at 100 mA, the resistance value rapidly drops at approximately 60° C. The drop of the resistance value is originated from the rapid increment of calorific value generated by a self exothermic function of the thermistor 2, at approximately 60° C. of the atmospheric temperature. This embodiment employs the latter described characteristic.

Figure 5:
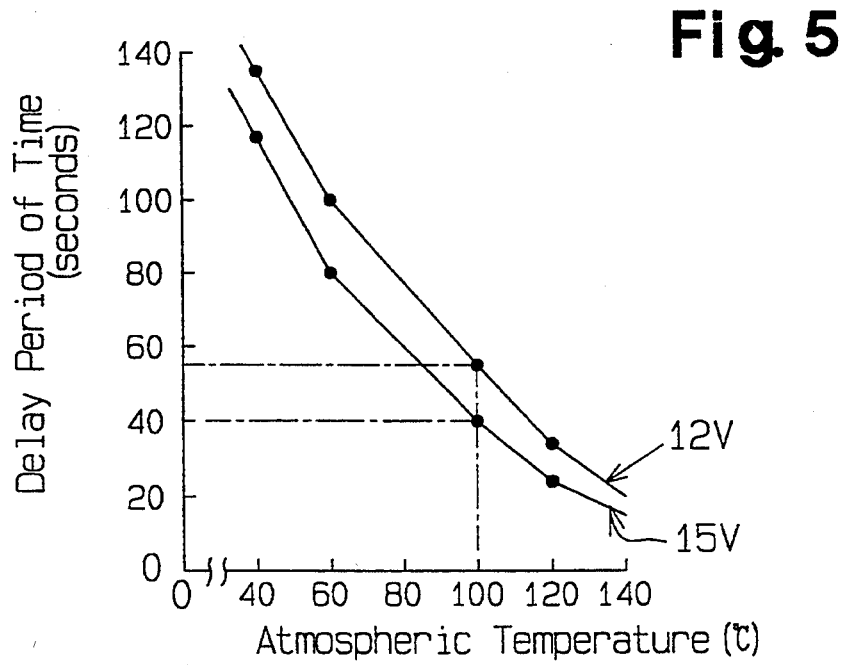

The graph shown in FIG. 5 shows the correlation between an atmospheric temperature and a delay period of time of the thermistor 2 for switching, on the basis of experiments conducted at certain voltages between terminals (i.e., 12 volts, 15 volts). As the atmospheric temperature rises, the delay period of time decreases. For example, when the atmospheric temperature is at 100° C. and the voltage between terminals is at 12 volts, the delay period of time is approximately 55 seconds. When the temperature is at 100° C. and the voltage is at 15 volts, the delay period of time is approximately 40 seconds.

The warning lamp 3 is provided in a combination meter panel for a driver. The warning lamp 3 is for warning the driver that there is a shortage of engine oil, and is activated to light up when a current having a larger value than a predetermined value is applied thereto.

FIG. 2 shows the oil level sensor 4. The sensor 4 includes a terminal housing 6 which is made of a conductive metal. A connector 7 is attached to the upper portion of the housing 6. The connector 7 is made of an insulating material, and accommodates a terminal 8 which is secured to the central portion thereof. The terminal 8 is connected to the battery 20, via the warning lamp 3. A main pipe 9 is fixed to the lower portion of the housing 6, and is made of a conductive metal. An insulator 11 is accommodated within the lower end portion of the main pipe 9, and is secured to the main pipe 9 so as to support the thermistor 2.

Further, a protective cover 10 having a cylindrical shape is attached to the lower end portion of the main pipe 9. The reed switch 1 is held within the protective cover 10. A ring shaped float 12 is provided around the protective cover 10, so that it is vertically movable. The float 12 includes at least one magnet 14 incorporated therein, for activating the reed switch 1. A stopper 13 is secured to the lower end portion of the protective cover 10. The stopper 13 is made of a conductive metal, and prevents the float 12 from coming out of the protective cover 10, even when the oil level becomes low.

The reed switch 1 is connected to the stopper 13, such that it is grounded via the stopper 13. Further, the reed switch 1 is connected to the thermistor 2, which is connected to the terminal 8 via a lead wire 15.

The oil level sensor 4 is attached to an engine block 16 (or an oil pan 17) through the terminal housing 6. Therefore, the main pipe 9 and protective cover 10 can be submerged into the engine oil in the oil pan 17. When the engine oil is adequately supplied, the buoyancy of the float 12 causes the float 12 to be located at the upper position of the protective cover 10. The reed switch 1 is not influenced by the magnetic force of the magnet 14. Therefore, the reed switch 1 is at the "OFF" position. On the contrary, an oil level (OL) may decrease below a predetermined level in relation to the decrement of the engine oil. In this case, the float 12 is located at the lower portion of the protective cover 10. Consequently, the reed switch 1 is influenced by the magnetic force of the magnet 14, such that the switch 1 is turned "ON".

The operations of the warning apparatus according to this embodiment will be described in more detail below.

Figure 6:
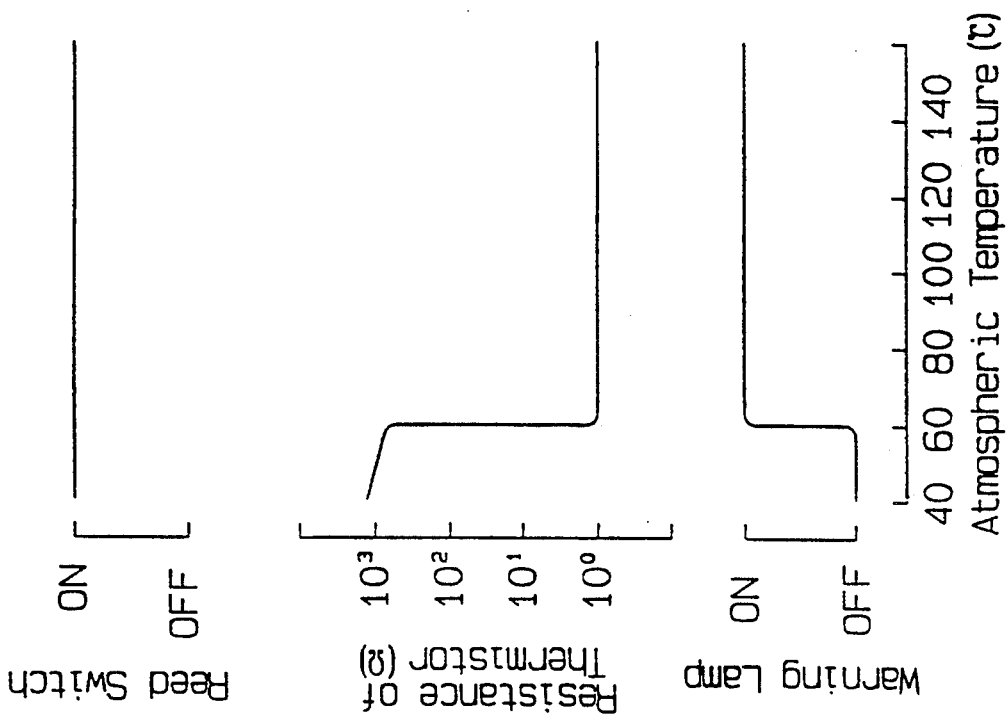

FIG. 6 shows the case in which the engine oil is adequately supplied (i.e., the oil level is high). In this case, the reed switch 1 is in the "OFF" condition, because the float 12 is located at the upper portion of the protective cover 10.

Therefore, the power is not supplied from the battery 20 to the thermistor 2 and the warning lamp 3. The thermistor 2 is practically in the "OFF" condition, because the thermistor 2 maintains the substantially high resistance value, regardless of the rise of atmospheric temperature. Regardless of either case, the warning lamp 3 remains "OFF".

Figure 7:
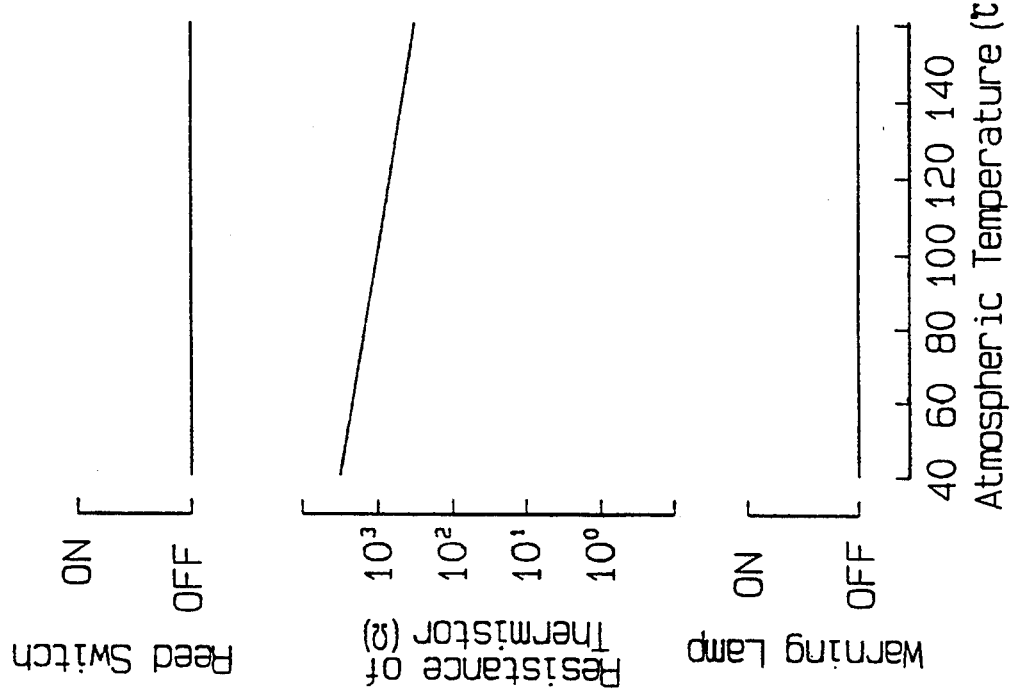

FIG. 7 shows the case in which the engine oil is low (i.e., the oil level is below the predetermined level). In this case, the reed switch 1 is turned "ON" by the action of the magnet 14, because the float 12 is located at the lower portion of the protective cover 10. The "ON" condition of the reed switch 1 permits the power to be supplied from the battery 20 to the thermistor 2 and the warning lamp 3. However, when the atmospheric temperature is less than 60° C., the thermistor 2 maintains the substantially high resistance value. Consequently, an adequate current will not flow in the series circuit. Therefore, the warning lamp 3 remains "OFF" and is not lit up.

Applying the voltage to the thermistor 2 causes the thermistor 2 to heat up. As the engine is warmed up, the atmospheric temperature is increased. When the atmospheric temperature reaches 60° C., the resistance value of the thermistor 2 rapidly drops. The drop of the resistance value permits the adequate current to flow in the series circuit, in order to light the warning lamp 3. As the warning lamp 3 is lit up, the driver is warned that the level of the engine oil is insufficient.

According to this embodiment, when the viscosity of the engine oil is high as the atmospheric temperature is less than 60° C., the warning lamp 3 is never lit up. In other words, even when the Oil Rise is significantly large, the warning apparatus of this embodiment no longer misjudges whether or not the engine oil is insufficient.

Further, the thermistor 2 requires a delay period of time as a function of the atmospheric temperature as indicated in FIG. 5, before the thermistor 2 becomes conductive after the voltage is applied thereto (i.e., after the reed switch 1 was turned on). In other words, lighting the warning lamp 3 is practically delayed by the delay period of time. The delay period of time effectively prevents the misjudgment caused by a conventional apparatus. For example, even when the reed switch 1 is temporarily turned "ON" in accordance with the temporal low indication of the oil level (OL), in the case where the engine oil is adequately supplied, the warning lamp 3 is not immediately lit up. In this way, the temporal low condition of the oil level does not cause the misjudgment of the oil level.

Furthermore, the warning apparatus of this embodiment differs from the conventional apparatus, that is the apparatus does not require an exclusive delay circuit for setting a delay period of time, and an exclusive ECU circuit for determining the oil shortage. This causes the circuit structure of the warning apparatus to be simplified, and the manufacturing cost of the apparatus to be reduced, in comparison with the conventional apparatus. Further, the simplified structure of the apparatus increases the reliability thereof and the installation ability on a vehicle.

Although only one embodiment of the present invention has been described herein, it should be apparent to those skilled in the art that the present invention may be embodied in many other specific forms without departing from the spirit or scope of the invention.

Particularly, it should be understood that the present invention can be employed in a liquid storage tank such as a gasoline tank. In this case, a shape of the oil level sensor can be properly altered to correspond to the shape of the tank. Furthermore, the warning lamp 3 can be integrally formed with the oil level sensor 4 which includes the sensor circuit 5.

Therefore, the present example and embodiment are to be considered as illustrative and not restrictive and the invention is not to be limited to the details giving herein, but may be modified within the scope of the appended claims.

What is claimed is:

1. An apparatus for detecting a level of the liquid stored in a reservoir, wherein the apparatus includes a power source, a warning device for warning of a low liquid level, and a regulator for controlling the power supplied to the warning device from the power source, wherein the regulator comprises:
   a switch for switching between ON and OFF conditions in accordance with the liquid level, said ON condition of said switch indicating that the present liquid level is lower than a predetermined liquid level;
   a thermistor connected to said switch in series, wherein the resistance of the thermistor decreases when a predetermined delay period of time has elapsed since the start of the application of voltage from the power source to the thermistor upon the turning ON of said switch; and
   whereby the decreased resistance of said thermistor allows the power for activating the warning device to be supplied to the warning device, while said switch is turned ON.

2. The apparatus according to claim 1, wherein the power source includes a battery, the warning device includes a lamp, and wherein said battery, said warning lamp, said switch and said thermistor are connected to one another in series.

3. The apparatus according to claim 1, wherein the resistance of said thermistor rapidly drops when the atmospheric temperature exceeds a predetermined temperature while the voltage is applied to said thermistor.

4. The apparatus according to claim 3, wherein said predetermined temperature is approximately 60° C.

5. The apparatus according to claim 3, wherein said warning device includes a warning lamp, whereby the lighting up of said warning lamp is synchronous with the rapid decrease of the resistance of said thermistor.

6. The apparatus according to claim 1, wherein said switch includes a reed switch and a float which has a magnet cooperating with said reed switch.

7. The apparatus according to claim 6 further comprising a liquid level sensor, wherein said reed switch and said thermistor are incorporated within said liquid level sensor.

8. The apparatus according to claim 7, for use in detecting the level of oil in an engine oil reservoir.

* * * * *